(12) United States Patent
Nousiainen et al.

(10) Patent No.: US 10,144,889 B2
(45) Date of Patent: *Dec. 4, 2018

(54) APPARATUS FOR PURIFYING MATERIAL OF BIOLOGICAL ORIGIN

(71) Applicant: UPM-KYMMENE CORPORATION, Helsinki (FI)

(72) Inventors: Jaakko Nousiainen, Lappeenranta (FI); Heli Laumola, Helsinki (FI); Arto Rissanen, Lappeenranta (FI); Jari Kotoneva, Lappeenranta (FI); Matti Ristolainen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 315 days.

This patent is subject to a terminal disclaimer.

(21) Appl. No.: 14/877,161

(22) Filed: Oct. 7, 2015

(65) Prior Publication Data

US 2016/0024407 A1    Jan. 28, 2016

Related U.S. Application Data

(62) Division of application No. 13/989,400, filed as application No. PCT/FI2011/051037 on Nov. 25, 2011, now Pat. No. 9,181,494.

(30) Foreign Application Priority Data

Nov. 26, 2010   (FI) ..................................... 20106252
Mar. 3, 2011    (FI) ..................................... 20115217
Jul. 6, 2011    (FI) ..................................... 20115723

(51) Int. Cl.
*B01D 1/06*   (2006.01)
*B01D 3/14*   (2006.01)
(Continued)

(52) U.S. Cl.
CPC ................ *C10L 1/02* (2013.01); *B01D 1/065* (2013.01); *B01D 1/22* (2013.01); *B01D 3/02* (2013.01);
(Continued)

(58) Field of Classification Search
CPC ... C10G 3/40; C10G 3/42; C10G 3/50; C10G 2300/1014; C10G 2300/301;
(Continued)

(56) References Cited

U.S. PATENT DOCUMENTS 2,200,468 A   5/1940   Cirves
2,296,952 A   9/1942   Ross et al.
(Continued)

FOREIGN PATENT DOCUMENTS

CA   2349780 A1   12/2001
DE   2736357 A1   2/1979
(Continued)

OTHER PUBLICATIONS

Coll, R. et al., "Conversion of the Rosin Acid Fraction of Crude Tall Oil into Fuels and Chemicals", Energy & Fuels 2001, 15, 1166-1172.

(Continued)

*Primary Examiner* — Jonathan Miller
(74) *Attorney, Agent, or Firm* — Cantor Colburn LLP (57) ABSTRACT

The present invention relates to a process and an apparatus for purifying tall oil material for the production of biofuels and components thereof. The present invention relates further to hydroprocessing of the purified material to obtain biofuels and components thereof.

6 Claims, 2 Drawing Sheets

(51) Int. Cl.

| | | |
|---|---|---|
| *C10L 1/02* | (2006.01) | |
| *B01D 1/22* | (2006.01) | |
| *C10G 3/00* | (2006.01) | |
| *C11B 13/00* | (2006.01) | |
| *C10L 1/18* | (2006.01) | |
| *B01D 3/02* | (2006.01) | |

(52) U.S. Cl.
CPC .............. *B01D 3/14* (2013.01); *C10G 3/40* (2013.01); *C10G 3/42* (2013.01); *C10G 3/50* (2013.01); *C10L 1/1802* (2013.01); *C11B 13/005* (2013.01); *C10G 2300/1014* (2013.01); *C10G 2300/205* (2013.01); *C10G 2300/301* (2013.01); *C10G 2400/02* (2013.01); *C10G 2400/04* (2013.01); *C10G 2400/08* (2013.01); *C10G 2400/26* (2013.01); *C10L 2200/0469* (2013.01); *C10L 2270/023* (2013.01); *C10L 2270/026* (2013.01); *C10L 2270/04* (2013.01); *C10L 2290/543* (2013.01); *Y02E 50/13* (2013.01); *Y02P 30/20* (2015.11); *Y02T 50/678* (2013.01); *Y02W 30/74* (2015.05)

(58) Field of Classification Search
CPC ........ C10G 2300/4012; C10G 2400/02; C10G 2400/04; C10G 2400/08; C10G 2400/26; B01D 1/065; B01D 1/22; B01D 3/14; B01D 3/42

See application file for complete search history.

(56) References Cited

U.S. PATENT DOCUMENTS

| 2,716,630 | A | 8/1955 | Spangenberg et al. |
| 2,886,492 | A | 5/1959 | Hanson et al. |
| 2,894,880 | A | 7/1959 | Sisson et al. |
| 3,449,313 | A | 6/1969 | Bolger et al. |
| 3,644,179 | A | 2/1972 | Knoer et al. |
| 3,887,537 | A | 6/1975 | Tetsuya et al. |
| 4,524,024 | A | 6/1985 | Hughes |
| 4,981,555 | A | 1/1991 | Hohmann et al. |
| 5,705,722 | A | 1/1998 | Monnier et al. |
| 5,969,092 | A | 10/1999 | Karvo |
| 6,409,882 | B1 | 6/2002 | Hayden |
| 8,680,324 | B2 | 3/2014 | Hamunen et al. |
| 8,735,637 | B2 | 5/2014 | Stigsson et al. |
| 9,175,228 | B2 | 11/2015 | Nousiainen et al. |
| 9,181,494 | B2 | 11/2015 | Nousiainen et al. |
| 2005/0033027 | A1 | 2/2005 | Rohr et al. |
| 2005/0051419 | A1 | 3/2005 | Zima et al. |
| 2005/0203279 | A1 | 9/2005 | Rojas et al. |
| 2007/0131579 | A1 | 6/2007 | Koivusalmi et al. |
| 2009/0163744 | A1 | 6/2009 | Abhari et al. |
| 2010/0038284 | A1 | 2/2010 | Vergel |
| 2010/0137556 | A1 | 6/2010 | Hamunen |
| 2011/0160505 | A1 | 6/2011 | McCall |
| 2012/0004390 | A1 | 1/2012 | Zhao et al. |
| 2012/0088943 | A1 | 4/2012 | Knuuttila et al. |
| 2012/0151828 | A1 | 6/2012 | Kalnes |
| 2013/0232851 | A1 | 9/2013 | Nousiainen et al. |

FOREIGN PATENT DOCUMENTS

| EP | 1291355 A1 | 3/2003 | |
| EP | 1586624 A1 | 10/2005 | |
| EP | 1637582 A1 | 3/2006 | |
| EP | 1741768 A1 | 1/2007 | |
| FI | 960525 | 8/1997 | |
| WO | 03038020 A1 | 5/2003 | |
| WO | 2004074233 A1 | 9/2004 | |
| WO | 2007003708 A1 | 1/2007 | |
| WO | 2007050030 A1 | 5/2007 | |
| WO | 2008017730 A1 | 2/2008 | |
| WO | 2008/101945 A1 | 8/2008 | |
| WO | 2009/011639 A2 | 1/2009 | |
| WO | 2009015055 A2 | 1/2009 | |
| WO | 2009125072 A1 | 10/2009 | |
| WO | 2009131510 A1 | 10/2009 | |
| WO | WO-2009131510 A1 * | 10/2009 | ............. C10L 1/026 |
| WO | 2010097519 A2 | 9/2010 | |
| WO | 2010/128208 A2 | 11/2010 | |

OTHER PUBLICATIONS

Betti, C. et al. "Sulfur Resistance of Pt-W Catalysts", Journal of Chemistry, vol. 2013, Article ID 502014, 8 Pages, http://dx.doi.org/10.1155/2013/502014.

Budian, Z. et al. "Rectification and utilization of tall oil", Chemical Industry Research Institute of Fujian Province, Fuzhou 350013, 3 Pages.

Folarin, O.M. et al. "Thermal Stability Studies on Some Metal Soaps of Hura Crepitans Seed Oil"; Electronic Journal of Environmental, Agricultural and Food Chemistry, 2011, vol. 10, Issue 8, pp. 2623-2628.

Gunstone, F. "Vegetable Oils in Food Technology", 2002, 11 Pages.

Harvey, B. et al. "High-Density Renewable Fuels Based on the Selective Dimerization of Pinenes", Energy Fuels, 2010, vol. 24, pp. 267-273.

Hookey, G. "ASTM Standard D86: Standard Test Method for Distillation of Petroleum Products", National Transportation Safety Board, Washington, D.C., 14 Pages.

Kumar et al, "Methods for Pretreatment of Lignocellulosic Biomass for Efficient Hydrolysis and Biofuel Production", Ind. Eng. Chem Res (2009), vol. 48, pp. 3713-3729.

Lin, Y. et al "Research Status of Biodiesel from Tall Oil", Journal of China Paper: Transaction of China Pulp and Paper, 2010, vol. 25, No. 3, pp. 73-76.

Marker, T.L. "Opportunities for Biorenewables in Oil Refineries: Final Technical Report"; Submitted to: U.S. Department of Energy; Period of Performance: Dec. 1, 2004 to Apr. 15, 2005; 60 Pages.

Mixture; Wikipedia, the free encyclopedia; url:https://en.wikipedia.org/wiki/Mixture; Retrieved Jul. 6, 2017, 1 Page.

Norlin, L.H. "Tall Oil"; Ullmann's Encyclopedia of Industrial Chemistry; 2000, 14 Pages.

Plate Molecular Still; GIG Karasek: Distillation, Evaporation, Drying; url:http://www.gigkarasek.com/en/plate-molecular-still/; Retrieved on Feb. 25, 2015, 3 Pages.

Presentation of Dr.-Ing. Ernst W. Munich, Cairo, Mar. 20, 2007, Degumming of plant oils for different applications, 30 Pages.

Presentation of W. De Greyt, W. Gibson and M. Kellens, Abu Dhabi, UAE, Apr. 15-16, 2008, Recent Developments in Bleaching, Deodorisation and Physical Refining of Oils and Fats, 30 Pages.

Schwab, A.W. et al. "Diesel Fuel from Thermal Decomposition of Soybean Oil"; Journal of the American Oil Chemists' Society; Nov. 1998, vol. 65, No. 11, pp. 1781-1786.

Tall Oil, Kirk-Othmer Encyclopedia of Chemical Technology, John Wiley & Sons, Inc., pp. 1-7.

Wang, H. et al. "Feasibility of Implementing Biorefinery at Pulp and Paper Mills", Biomass Chemical Engineering, Sep. 2009, vol. 43, No. 5, 5 Pages.

Zinkel, Duane F. and James Russell, editors "Naval Stores: Production, Chemistry, Utilization", Pulp Chemicals Association, 1989, New York, NY 10165, pp. 25-363.

Film Evaporation Technology, Sulzer, Sulzer Chemtech, 12 Pages.

International Search Report of PCT/FI2011/051037 dated Mar. 8, 2012.

International Preliminary Report on Patentability of PCT/FI2011/051037 dated Feb. 22, 2013.

Finnish Search Report of FI 20115217 dated Oct. 25, 2011.

CN Office Action of 201180056724.2 dated Jan. 5, 2015.

Final Office Action for U.S. Patent Application 13/989,400; Date filed: May 23, 2015; Date of Notification Feb. 05, 2015; 11 pp.

Non-Final Office Action for U.S. Appl. No. 13/989,400, filed May 23, 2013; Notification Date: Sep. 19, 2014; 12 pages.

Notice of Allowance for U.S. Appl. No. 13/989,400, filed May 23, 2013; Notification Date: Jul. 7, 2015; 11 pages.

(56) References Cited

OTHER PUBLICATIONS

Restriction Requirement for U.S. Appl. No. 13/989,400 filed May 23, 2013; Notification Date: Jul. 10, 2014; 9 pages.
Written Opinion of the International Searching Authority for International Application No. PCT/FI2011/051037; International Filing Date Nov. 25, 2011; 4 pages.
Breitmaier, E. "Terpenes: Flavors, Fragrances, Pharmaca, Pheromones", WILEY-VCH Verlag GmbH & Co. KGaA, 2006.
D25 (Abb. A.47 in Organikum, 20. Auflage, Wiley-VCH, 1999, ISBN 3-527-29719-7).
Wansbrough, "Tall Oil Production and Processing" New Zealand Institute of Chemistry, https://nzic.org.nz/app/uploads/2017/10/4G.pdf, 11 pages, Retrieved on Jun. 19, 2018.

\* cited by examiner

APPARATUS FOR PURIFYING MATERIAL OF BIOLOGICAL ORIGIN

CROSS REFERENCE TO RELATED APPLICATIONS

This application is a division of U.S. patent application Ser. No. 13/989,400 filed May 23, 2013, which claims priority under 35 U.S.C. 371 to International Application No. PCT/FI2011/051037 filed on Nov. 25, 2011, which claims priority to Finnish Patent Application No. 20106252 filed Nov. 26, 2010, Finnish Patent Application No. 20115217 filed Mar. 3, 2011, and Finnish Patent Application No. 20115723 filed Jul. 6, 2011. The priority applications are fully incorporated herein by reference.

FIELD OF THE INVENTION

The present invention relates to a process and an apparatus for purifying feed material of biological origin for the purposes of producing biofuels and components thereof. Especially the invention relates to a process and an apparatus for purifying tall oil material. The invention also relates to the use of the purified fractions recovered from the process for the production of biofuels and components thereof by hydroconversion processes.

BACKGROUND OF THE INVENTION

Raw materials of biological origin are potential sources of various biofuels or biofuel components. These raw materials can be converted to biofuels by feeding the raw material through a catalytic reactor by contacting it simultaneously with gaseous hydrogen. The resulting product is drawn off from the reactor as a product stream which can be further fractionated for example by distillation to form biofuel/biofuel components.

There are however various problems related to production processes of biofuels from the raw materials of biological origin, such as poisoning and clogging of the catalyst material used in the production processes. There are impurities in the raw materials of biological origin, such as metals and solids that cause the inactivation of the catalyst material or cause coking on the catalyst and prevent it to function properly. In order to prevent the inactivation of the catalyst and to prolong its lifetime, the raw material can be purified and/or pretreated before feeding it to the hydrotreatment process. Purifying of the raw materials of biological origin to be suitable for feeding to a catalytic process is also challenging. Prior art describes various ways of doing this. However, these all have problems and the quality of the raw material is not always on a required level for the catalytic step to be able to function in the most efficient way.

One possibility of purifying and/or pretreating a raw material of biological origin, such as crude tall oil (CTO), which is to be fed to catalytic hydrotreatment processes, is ion-exchange with a cationic and/or anionic ion exchange resin.

Another possibility is to use methods such as adsorption on a suitable material or acid washing to remove alkaline metals and earth alkaline metals (Na, K, Ca). The adsorption material can be catalytically active or inactive. Yet another possibility is to use degumming for removing metals in the feed.

When the raw material of biological origin contains tall oil, depitching of the crude tall oil can also be used to remove impurities from the tall oil. Depitched tall oil is obtained by evaporating crude tall oil, for example by thin-film evaporator. U.S. Pat. No. 5,705,722 describes converting unsaturated fatty acids, for example tall oil fatty acids to naphtha and cetane improvers for diesel fuels. However, this process has disadvantages, for example the yield of biofuel or biofuel components, i.e. naphtha and cetane improvers, is poor. This is due to the fact that in depitching a huge amount of valuable raw material for hydrogenation is lost as residue, i.e. pitch. According to the document, the residue is used as such as fuel for boilers.

BRIEF DESCRIPTION OF THE INVENTION

An object of the present invention is thus to provide a process and an apparatus for implementing the process so as to overcome the above problems. The objects of the invention are achieved by a process and an apparatus, which are characterized by what is stated in the independent claims. The preferred embodiments of the invention are disclosed in the dependent claims.

The present invention relates to a process for purifying tall oil material, comprising the following steps
  (a) evaporating the tall oil material in a first evaporation step to produce a first fraction comprising light hydrocarbons and water and a second fraction comprising fatty acids, resin acids, neutral substances and residue components,
  (b) evaporating said second fraction in at least one further evaporation step (G; F,G) to produce a third fraction comprising fatty acids, resin acids and light neutral substances, and a residue fraction, and
  (c) recovering said first fraction, third fraction and residue fraction.

The present invention also relates to an apparatus for purifying tall oil material wherein the apparatus comprises
  a first evaporator arranged to evaporate said tall oil material and to produce a first fraction comprising light hydrocarbons and water and a second fraction comprising fatty acids, resin acids, neutral substances and residue components,
  at least one further evaporator arranged to evaporate said second fraction and to produce a third fraction comprising fatty acids, resin acids and light neutral substances and a residue fraction,
  a first connection arranged to feed the second fraction to said at least one further evaporator, and
  optionally one or more further connections between said further evaporators.

In a preferred embodiment of the invention, said at least one further evaporation step is performed in one step, whereby the process as a whole comprises two evaporation steps. In another preferred embodiment of the invention, said at least one further evaporation step is performed in two steps, whereby the evaporation as a whole comprises three steps.

In a further preferred embodiment of the invention, the process further comprises a pretreatment step of storing the tall oil material in a storage tank before the first evaporation step.

The present invention also relates to the use of an apparatus comprising at least two sequentially arranged evaporators, for example three sequentially arranged evaporators, for purifying tall oil material.

Furthermore, the present invention relates to the use of the light hydrocarbons, fatty acids, resin acids and light neutral substances obtained in accordance with the process of the present invention for the production of biofuels and components thereof. Especially the invention relates to the use of the light hydrocarbons for the production of gasoline, naphtha, jet fuel, diesel and fuel gases and to the use of the fatty acids, resin acids and light neutral substances for the production of diesel, jet fuel, gasoline, naphtha and fuel gases.

The invention is based on the idea of purifying tall oil material to obtain purified hydrocarbon fractions. The purification in accordance with the present invention is performed by evaporation. The purified hydrocarbon fractions obtained in the process, after optional further purification, can be used as feedstock for the production of biofuels, such as biogasoline, biodiesel and/or components thereof. The purifying of the tall oil material in accordance with the present invention is performed by a multistep evaporation process, for example by a three-step process.

In the process of the present invention, the evaporation is accomplished in such a manner that the amount of residue from the evaporation is very small, typically ranging from 5% to 15%, preferably under 10% by weight from the feed. This is a great advantage over the prior art depitching processes, where the amount of the pitch residue from the evaporation may be as high as 20% to 35% by weight from the feed. In the present invention, the process conditions (temperature, pressure) are controlled in such a way that as much as possible of the neutral components of the tall oil material are withdrawn with the recovered fractions for further utilization, instead of being withdrawn with the residue as in the prior art tall oil depitching processes.

An advantage of the process and system of the invention comprising a multi-step evaporation is that when tall oil material is evaporated, the impurities, such as metals and solids are retained in the concentrate and the condensate retrieved from the evaporation is ready to be fed to the hydroprocessing reactor. Water and light components are first evaporated from the tall oil material, which makes further evaporation steps more efficient. Also the risk of carry-over of non-desired residual substances into the distillate fraction in the further evaporation steps is reduced in a controlled way. An advantage of such purifying with a multi-step evaporation is that the boiling takes place in a more controlled manner because low boiling light components, i.e. components having boiling point of 150-210° C., preferably 150-170° C., at a normal pressure, do not cause so much "carry over", i.e. migrating of the compounds having a boiling point range at the higher end of the above boiling point ranges as well as impurities to the vapour in the subsequent evaporation steps. The light components can be, if desired, returned back to the material of biological origin or refined further in another process or sold further as such.

A still further advantage of using three-step evaporation is that the evaporator in the second evaporation step can be a small and cheap evaporator that removes light components from the feed material. The following third evaporator can also be smaller and cheaper than the second evaporator in two-step evaporation. Consequently, a three-step evaporation unit can be cheaper than a two-step evaporation unit.

A still further advantage of the present invention compared to those known from the prior art is that the material purified according to the present invention is ready to be fed to hydroprocessing and the hydroprocessing is able to produce fuel components with excellent yield, because the pitch fraction is minimized.

A further advantage of the present invention is that the heavy components generated from the pitch can be avoided in the product fractions. A still further advantage of the present invention is that the yield of the purified material from the evaporation is as high as 65% to 95%, in a preferred embodiment from 80% to 95% and in a most preferred embodiment from 88% to 95%.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Tall oil material in connection with the present invention refers to a byproduct of Kraft pulping of wood, especially coniferous wood. The tall oil material is a mixture of fatty acids, resin acids, neutral compounds and turpentine components originating from wood, especially coniferous wood. The turpentine components of tall oil are substantially composed of $C_{10}H_{16}$ terpenes.

In one embodiment of the invention, the tall oil material is crude tall oil (CTO). CTO refers to the processed mixture of naturally-occurring compounds extracted from wood species like pine, spruce and aspen. It is obtained from the acidulation of crude tall oil soap from Kraft and sulphite pulping processes used in paper making. Crude tall oil (CTO) generally contains both saturated and unsaturated oxygen-containing organic compounds such as resin acids (mainly abietic acid and isomers thereof), fatty acids (mainly linoleic acid, oleic acid and linolenic acid), neutral substances, fatty alcohols, sterols and other alkyl hydrocarbon derivatives, as well as inorganic impurities (alkaline metal compounds, sulphur, silicon, phosphorus, calcium and iron compounds. CTO also covers soap oil.

In one embodiment of the invention, the tall oil material used for the feed or a part thereof may comprise purified CTO. Depitching, washing and/or distilling may be used for the purification of CTO.

In another embodiment of the invention, fatty acids or free fatty acids obtained from tall oil may be used as tall oil material, alone or as a mixture of other tall oil material.

In a further embodiment of the invention, soap oil may be used as the tall oil material for the feed. Also mixtures of soap oil and tall oil can be used as the tall oil material for the feed.

In connection with the present invention, the tall oil materials for the feed mixture are preferably selected from tall oil, crude tall oil (CTO), soap oil and mixtures thereof, for example.

The evaporation in connection with the present invention refers to any suitable separation method for separating two or more components from each other, such as gases from liquid, which separation method is based on utilising the differences in the vapour pressure of the components. Examples of such separation methods are evaporation, flashing and distillation. Preferably the evaporating is performed in an evaporator using thin film evaporation technology. In this embodiment of the invention, the evaporator can thus be selected from the group consisting of thin film evaporator, falling film evaporator, short path evaporator and plate molecular still and any other evaporator using thin film technology. The falling film evaporator refers to a falling film tube evaporator.

The evaporating in the process is performed with any commercially available suitable evaporators. Preferably the evaporating is performed in an evaporator selected from the group defined above. In an especially preferred embodiment of the invention, the evaporation is performed by evaporation using thin film evaporation. Suitable combinations for evaporators (in this order) in the evaporation unit are:

For two stage evaporation:
TF+SP
FF+TF
TF+FF
TF+TF
For three stage evaporation:
TF+TF+SP
TF+PMS+SP
FF+TF+SP
FF+TF+TF
where
TF=thin film evaporator
FF=falling film tube evaporator
SP=short path evaporator
PMS=plate molecular still Thus in one embodiment, the evaporation in a two-step evaporation is performed by using a thin film evaporator in the first evaporation step and a short path evaporator in the second evaporation step. In another embodiment, the two-step evaporation is performed by using a thin film evaporator in the first evaporation step and a falling film evaporator in the second evaporation step. Yet in another embodiment, the two-step evaporation is performed by using a thin film evaporator both in the first and second evaporation steps. In a preferred embodiment, the two-step evaporation is performed by using a falling film evaporator in the first evaporation step and a thin film evaporator in the second evaporation step.

In one embodiment of a three-step evaporation, the evaporation is performed by using a thin film evaporator in the first step, a plate molecular still in the second step and a short path evaporator in the third evaporation step. In another embodiment, the three-step evaporation is performed by using a thin film evaporator in the first step, a thin film evaporator in the second step and a short path evaporator in the third evaporation step. In another embodiment, the three-step evaporation is performed by using a falling film evaporator in the first step, a thin film evaporator in the second step and a short path evaporator in the third evaporation step. Yet in another embodiment, the three-step evaporation is performed by using a falling film evaporator in the first step, and a thin film evaporator in the second and third evaporation steps. The second evaporator in both two-step and three-step evaporation is most preferably a thin film evaporator.

In connection with the present invention, the impurities to be removed by the evaporation refer to water, solids, such as lignin, particulates, various inorganic compounds, metals, such as Na, Fe, P and Si, sulphur compounds, such as sulphates, for example $Na_2SO_4$ and $H_2SO_4$, and organic compounds, such as carbohydrates. Many of these impurities (such as metals and sulphur compounds) are harmful in later catalytic hydroprocessing steps and are therefore not desirable in the feed to the hydroprocessing.

Figure 1:
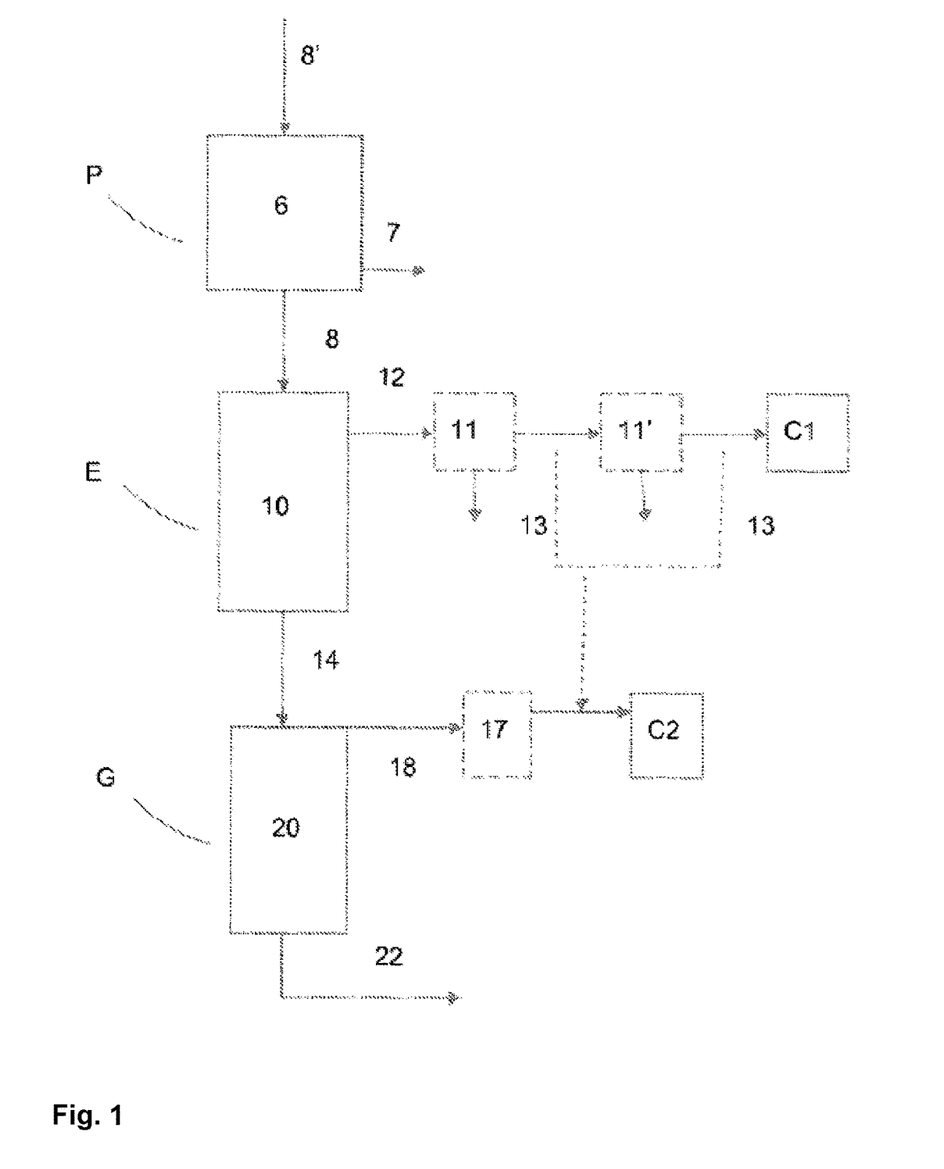
FIG. 1 shows a flowchart and an apparatus according to the present invention for the process for purifying tall oil material wherein the apparatus comprises two evaporators.
Figure 2:
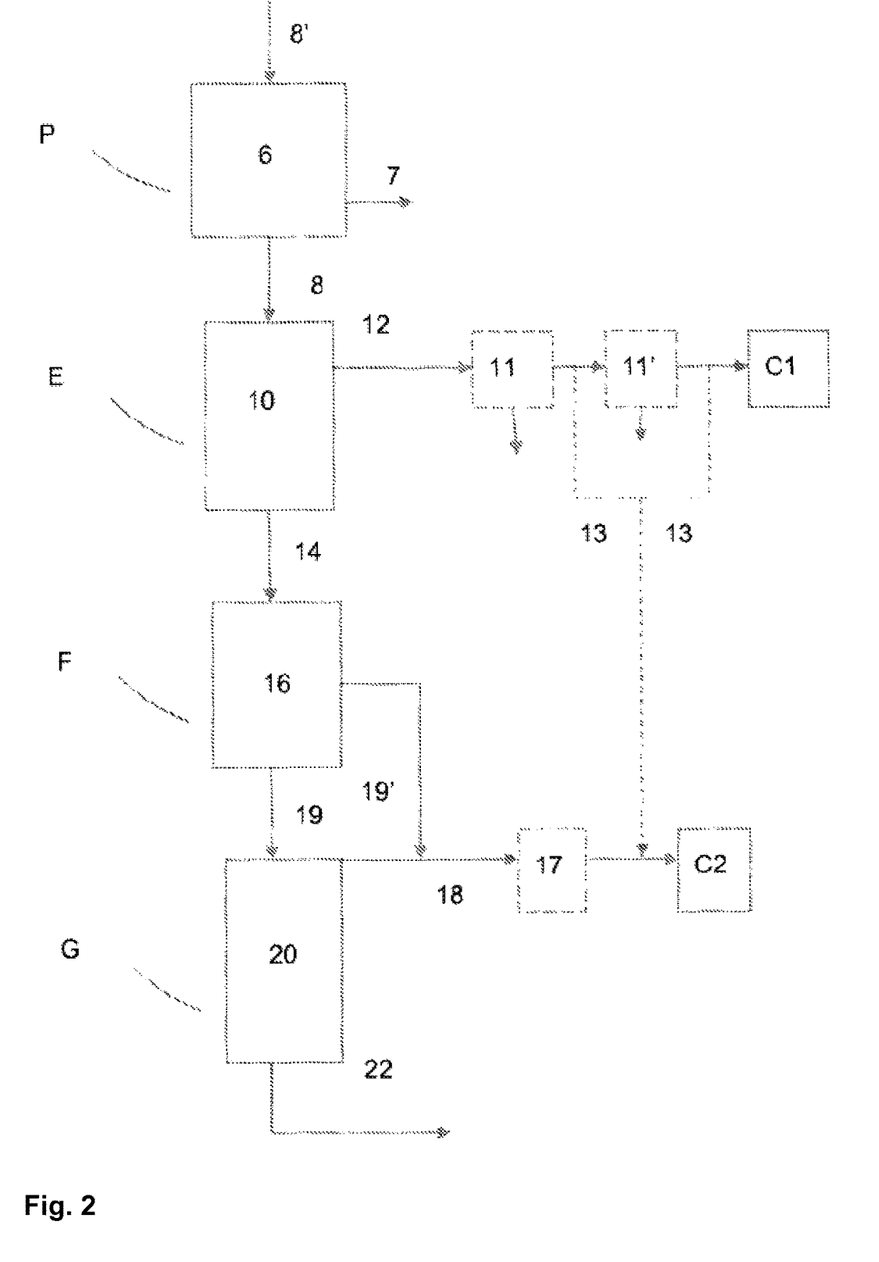
FIG. 2 shows a flowchart and an apparatus according to the present invention for the process for purifying tall oil material wherein the apparatus comprises three evaporators.

In the following, the process of the invention will be explained by referring to FIGS. 1 and 2, which are here to be contemplated as a flowchart of the process. FIG. 1 discloses a process comprising two-step evaporation. FIG. 2 discloses a process comprising three-step evaporation.

The evaporation in accordance with the present invention comprises a first evaporation step E and at least one further evaporation step shown by letter G or letters F and G. In accordance with the embodiment of FIG. 1, said at least one further evaporation step is performed in one step G, whereby the evaporation as a whole comprises two steps E, G. In accordance with FIG. 2, said at least one further evaporation step is performed in two steps F and G, whereby the evaporation as a whole comprises three steps E, F and G.

In the first evaporation step E, light hydrocarbons and water are evaporated off as distillate. Fatty acids, resin acids, neutral substances and residue components are remained as the evaporation concentrate.

In said at least one further evaporation step (G; F,G), compounds comprising fatty acids, resin acids and light neutral substances are evaporated off as distillate. Residue components and heavy neutral substances are retained in the evaporation concentrate and are recovered as a first residue fraction (also named as a residue fraction in connection with the present invention).

In connection with the present invention, neutral substances of tall oil material refer to a mixture of components, such as esters of fatty acids, sterols, stanols, dimeric acids, resin and wax alcohols, hydrocarbons and sterol alcohols. Fatty acids and resin acids refer to those inherently present in tall oil material. Fatty acids mainly comprise linoleic acid, oleic acid and linolenic acid. Resin acids mainly comprise abietic acid and isomers thereof.

In connection with the present invention, the light hydrocarbons recovered from the first evaporation step E refer to hydrocarbons having a boiling point of up to 250° C. (NTP). These hydrocarbons mainly comprise terpenes, of which most is turpentine.

Said light neutral substances recovered in the distillate from said at least one further evaporation step (G; F,G) comprise $C_{20}$-$C_{27}$-hydrocarbons, such as resin and wax alcohols, sterol alcohols and light sterols. The light neutral substances typically have a boiling point under 500° C. (NTP).

Said first residue fraction comprises heavy neutral substances and residue components, such as pitch and metals and other inorganic material. The first residue fraction typically contains components having a boiling point of over 500° C. (NTP).

Said heavy neutral substances recovered in the first residue fraction refer to hydrocarbons having at least 28 carbon atoms, such as sterols, stanols and dimeric acids, having a boiling point of over 500° C. (NTP).

The first evaporation step E is performed in a first evaporator 10. The evaporation is preferably performed at a temperature of 50 to 250° C. and at a pressure of 5 to 100 mbar, more preferably at a temperature of 120 to 200° C. and a pressure of 10 to 55 mbar. In the first evaporation step, water and light hydrocarbons are removed. The evaporation in the first evaporation step E is preferably performed by thin film evaporation.

According to the embodiment of FIG. 1, said at least one further evaporation step (second evaporation step in the embodiment of FIG. 1) is performed in one step G in a second evaporator 20. The second evaporation step is preferably effected at a temperature of 200 to 450° C. and a pressure of 0 to 50 mbar, more preferably at a temperature of 300 to 390° C. and a pressure of 0.01 to 15 mbar. Within this temperature and pressure range, the proportion of the pitch fraction (residue fraction) in this evaporation step is minimized. The evaporation in the second evaporation step G is preferably performed by short path evaporation.

According to the embodiment of FIG. 2, said at least one further evaporation step is performed in two steps F and G in two further evaporators 16 and 20. The first (F) of said two further evaporation steps (second evaporation step in the embodiment of FIG. 2) is preferably performed at a temperature of 180 to 350° C. and a pressure of 0.1 to 40 mbar, more preferably at a temperature of 200 to 270° C. and a pressure of 0.1 to 20 mbar. The second evaporation step F of the embodiment of FIG. 2 is preferably performed by plate molecular still evaporation or thin film evaporation. The third evaporation step G of the embodiment of FIG. 2 is preferably performed at a temperature of 200 to 450° C. and a pressure of 0 to 50 mbar, more preferably at a temperature of 300 to 390° C. and a pressure of 0.01 to 10 mbar. The third evaporation step of the embodiment of FIG. 2 is preferably performed by short path evaporation.

The first evaporation step E in accordance with the present invention provides a first fraction comprising light hydrocarbons and water, which is withdrawn through the first product outlet 12. This fraction may be further treated by separating the water in water separation step 11, whereafter the light hydrocarbon fraction thus obtained may be subjected to one or more further purifications 11', for example by ion exchange. The light hydrocarbons of the first fraction may be then subjected to catalytic processes C1 for the production of biofuels and components thereof, such as gasoline, naphtha, jet fuel, diesel and fuel gases. The biofuels and components thereof produced from the light hydrocarbons of the first fraction refer to hydrocarbons having a boiling point in the range of 20 to 210° C., preferably 20 to 170° C. at a normal pressure.

The first evaporation step E also provides a second fraction comprising fatty acids, resin acids, neutral substances and residue components, such as pitch and metals. This second fraction is introduced into said at least one further evaporation step (G; F,G) for further purification through connection 14.

In accordance with the embodiment of FIG. 1, said second fraction comprising fatty acids, resin acids, neutral substances and residue components is introduced to the second evaporation step G through connection 14. The second evaporation step G in FIG. 1 is performed in a second evaporator 20. The second evaporation step G in FIG. 1 provides a third fraction comprising fatty acids, resin acids and light neutral components, which is withdrawn through a second product outlet 18. The second evaporation step G also provides a first residue fraction comprising residue components, such as pitch and metals. The first residue fraction is withdrawn through a first residue outlet 22.

In accordance with the embodiment of FIG. 2, said second fraction comprising fatty acids, resin acids, neutral substances and residue components is treated in two evaporation steps F and G, instead of only one step G. Said fraction is first introduced into a second evaporation step F through connection 14. The second evaporation step F in FIG. 2 is performed in a second evaporator 16. The liquid fraction from the second evaporator 16 is directed to a third evaporation step G through connection 19. The distillate fraction from the second evaporator step 16 is withdrawn through connection 19' and may be combined with the third fraction from the third evaporation step G. The third evaporation step G is performed in a third evaporator 20. The third evaporation step G in FIG. 2 provides a third fraction comprising fatty acids, resin acids and light neutral substances, which is withdrawn through a second product outlet 18. The third evaporation step G of FIG. 2 also provides a first residue fraction comprising residue components, such as pitch and metals. In the same way as in FIG. 1, the first residue fraction is withdrawn through the first residue outlet 22.

The third fraction withdrawn through the second product outlet 18 in the embodiments of FIGS. 1 and 2 may be then subjected to catalytic processes C2 for the production of biofuels and components thereof, such as diesel, jet fuel, gasoline, naphtha and fuel gases. The biofuels or components thereof produced from the third fraction refer to hydrocarbons having a boiling point in the range of 150 to 380° C. at a normal pressure.

In an embodiment of the invention, the process may further comprise a pretreatment step P of storing said tall oil material in a storage tank 6 before the first evaporation step E. In this embodiment of the invention, the tall oil material is introduced to the first evaporation step E from a storage tank 6 through connection 8. In this embodiment of the invention, the tall oil material is kept in a storage tank for periods of hours to weeks before feeding to the first evaporation step E. This provides the advantage that non-desired components, such as water and solids separating from the tall oil by gravity and impurities such as metals and inorganic sulphur compounds dissolved or adsorbed/absorbed to them are separated from the tall oil material already in the storage tank and can be easily removed from the tall oil material for example by decantation through a second residue outlet 7 before feeding to the first evaporation step E.

In addition to selecting optimal evaporating process conditions in the evaporation steps E,F,G, the catalyst in the later hydroprocessing steps C1,C2 may be selected so that it is capable of transforming the heavy components in the purified material to biofuel components.

Between the last evaporation step G (the second evaporation step in the embodiment of FIG. 1 and the third evaporation step in the embodiment of FIG. 2) and hydroprocessing C2 there may be an additional purification step 17.

In one embodiment of the invention, the light hydrocarbons of the first fraction withdrawn through a connection 13 from the optional water removal step 11 or from one or optional further purification steps 11' may be combined with the third fraction comprising fatty acids, resin acids and light neutral compounds, which is withdrawn through the second product outlet 18 from the last evaporator 20. The fractions may be combined either before or after the additional purification step 17 of the third fraction.

The additional purification step 17 may be realised using for example a guard bed, i.e. a separate pretreatment/purification bed prior to the hydroprocessing C2. The additional purification 17 may also be realised by a purification bed or a section located in connection with the hydroprocessing reactor. The hydroprocessing optionally comprises one or more guard beds. The one or more guard beds can be arranged either to separate guard bed units and/or in the hydroprocessing reactor.

The guard bed has the task of acting against harmful substances in the feed. The guard bed is typically activated gamma aluminium oxide or some commercially available purifying catalyst. The guard bed material may be catalytically active or inactive. The guard bed or the guard bed units can retain both solid and solvated impurities of the tall oil material, such as silicon based antifoaming agents of a tall oil process and harmful chemical elements. The guard bed and/or the guard bed units can be heated, unheated, pressurized or unpressurised, fed with hydrogen gas or without hydrogen gas. Preferably the guard bed and/or the guard bed units are heated and pressurised.

There are basically two types of guard beds, i.e. active and inactive guard beds. The active guard beds take part in the purification of the feed and changing the chemical composition of the feed and they can be placed either in separate guard bed units or inside the hydroprocessing reactor itself. The inactive guard beds merely take part in the purification of the feed. These guard beds comprise suitable passive or inert materials which do not significantly change the molecular structure of the feed components but are effective towards harmful substances and elements. The separate guard beds can be multiplied, whereby there is one or several guard beds in a stand-by mode in parallel or in series with the guard bed(s) in use.

After the purification by evaporating, the purified fractions are fed to the hydroprocessing. The fractions can be hydrotreated separately or in the same apparatus.

Consequently, the first and third fraction obtained from the process of the present invention and withdrawn through the first and second product outlets 12,18 may be further fed to hydroprocessing C1, C2, after an optional water removal step 11 and one or more optional further purification steps 11',17. Hydroprocessing C1,C2 comprises at least one catalyst to form a mixture of fuel components. The hydroprocessing can be done in one, two or more steps in one apparatus or in several apparatuses.

The light hydrocarbons of the first fraction withdrawn through the first product outlet 12 are hydroprocessed to obtain gasoline, naphtha, jet fuel, diesel and fuel gases.

The fatty acids, resin acids and light neutral substances withdrawn through the second product outlet 18 are hydroprocessed to obtain diesel, jet fuel, gasoline, naphtha and fuel gases.

The invention also relates to an apparatus for purifying tall oil material. The apparatus of the invention may be used for implementing the process of the invention. The apparatus of the invention will now be explained with reference to FIGS. 1 and 2, which are here to be contemplated as referring to the elements of the apparatus.

The apparatus comprises
  a first evaporator 10 arranged to evaporate tall oil material and to produce a first fraction comprising light hydrocarbons and water and a second fraction comprising fatty acids, resin acids, neutral substances and residue components,
  at least one further evaporator (20;16,20) arranged to evaporate said second fraction and to produce a third fraction comprising fatty acids, resin acids and light neutral substances and a residue fraction,
  a first connection 14 arranged to feed the second fraction to said at least one further evaporator (20;16,20), and optionally one or more further connections 19 between said further evaporators 16,20.

In accordance with the embodiment of FIG. 1, said at least one further evaporator comprises one evaporator 20. In this embodiment of the invention, the apparatus as a whole comprises two sequentially arranged evaporators 10 and 20.

In accordance with the embodiment of FIG. 2, said at least one further evaporator comprises two evaporators 16 and 20. In this embodiment of the invention, the apparatus as a whole comprises three sequentially arranged evaporators 10, 16 and 20.

The evaporators 10, 16, 20 mean here any suitable equipments for separating two or more components from each other, such as gases from liquid, which separator utilises the differences in the vapour pressure of the components. The separators and evaporators are described above in connection with the process of the invention. In the embodiments of FIGS. 1 and 2, the first evaporator 10 is preferably a thin film evaporator or a falling film evaporator. In the embodiment of FIG. 1, the second evaporator 20 is preferably a thin film evaporator. In the embodiment of FIG. 2, the second evaporator 16 is preferably a plate molecular still or a thin film evaporator and the third evaporator 20 is preferably a short path evaporator. Most preferably the second evaporator is a thin film evaporator.

The apparatus further comprises a first product outlet 12 for recovering the fraction comprising light hydrocarbons and water from the first evaporator 10, a second product outlet 18 for recovering the third fraction comprising fatty acids, resin acids and light neutral substances from said at least one further evaporator (20;16,20) and a first residue outlet 22 for recovering a first residue fraction containing pitch and metals from said at least one further evaporator (20; 16,20).

Referring to FIG. 2, when said at least one further evaporator comprises two evaporators 16,20, the second product outlet 18 and the first residue outlet 22 are connected to the last evaporator 20.

In a typical embodiment of the invention, the apparatus further comprises one or more first feed inlets 8 arranged to feed the tall oil material to said first evaporator 10.

The feed inlet/inlets 8 may be any suitable inlets for feeding the tall oil material to the system, such as pipe, hose, hole or any suitable connection.

According to an embodiment of the invention shown in FIGS. 1 and 2, the apparatus may further comprise at least one storage tank 6 for the tall oil material located before the first evaporator 10 in the flow direction of the tall oil material. The storage tank in accordance with the present invention may be any suitable commercially available tank, vessel, container or such.

In this embodiment of the invention, the apparatus may further comprise a second residue outlet 7 for recovering a second residue fraction comprising water and inorganic material from the storage tank 6.

In this embodiment of the invention, the apparatus may further comprise a second feed inlet 8' for feeding the tall oil material to the storage tank 6.

The apparatus of the invention may further comprise at least one catalytic hydroconversion unit C1, C2 for converting the light hydrocarbons of the first fraction to one more biofuels or components thereof selected from the group consisting of gasoline, naphtha, jet fuel, diesel and fuel gases and/or for converting the third fraction comprising fatty acids, resin acids and light neutral substances to one or more biofuels or components thereof selected from diesel, jet fuel, gasoline, naphtha and fuel gases.

Consequently, the light hydrocarbons of the first fraction recovered through the first product outlet 12 from the first evaporator 10 can be fed to a first catalytic hydroprocessing unit C1 or to a second catalytic hydroprocessing unit C2.

The third fraction comprising fatty acids, resin acids and light neutral substances recovered through the second product outlet 18 from said at least one further evaporator 20 can be fed to a second catalytic hydroprocessing unit C2.

In the figures, the first and second catalytic hydroprocessing processes/units C1,C2 are presented as separate units/processes. However, it is also possible to combine these units/processes and treat both recovered hydrocarbon fractions in one process having one or more process steps.

Referring to FIGS. 1 and 2, the apparatus of the invention may also comprise a water separation unit 11 and one or more further purification units 11' arranged before the first catalytic hydroprocessing unit C1 and one or more further purification units 17 arranged before the second hydroprocessing unit C2. The apparatus may further comprise a connection 13 arranged after the water separation unit 11 or after said one or more further separation units 11', to feed the recovered light hydrocarbons of the first fraction to the third fraction withdrawn through connection 18.

EXAMPLES

In the following examples 1 and 2, the impurities in the material of biological origin were removed by two different evaporation units. In Example 1, the evaporation unit comprised of two evaporators and in Example 2 the evaporation unit comprised of three evaporators. The material of biological origin was crude tall oil.

Example 1

Crude tall oil (CTO) was fed from storage at a temperature of 60° C. to an evaporation unit containing a thin film evaporator and a short path evaporator. The feed rate of the crude tall oil to the evaporation unit was between 30-80 kg/h. The temperature of the first evaporation step was 137° C. and the pressure was 18 mbar. A first fraction comprising water and turpentine was removed from the feed of crude tall oil.

The first evaporation step was performed on a thin film evaporator. In the first evaporator, all together 3% of the original amount of crude tall oil was evaporated, of which 2% was turpentine and other light hydrocarbon compounds and 1% was water. 97% of the amount of the original feed of crude tall oil was recovered as condensate, i.e. second fraction, from the first evaporator and fed further to a second evaporator. The second evaporation step was performed on a short path evaporator at 315° C. and 0.3 mbar. 5% of the amount of the original feed was removed from the second evaporation step as a residue fraction comprising pitch. Distillate, third fraction, was recovered from the second evaporating step and the amount of it was 92% of the amount of the original feed of crude tall oil. The residue fraction removed from the second evaporator contained 1600 ppm metals in total consisting mainly of Na, Fe, P and 10 to 20 other metals, and in addition to metals also $SO_4^{2-}$, in the form of $Na_2SO_4$ and lignin.

Example 2

Crude tall oil (CTO) with a metal content of 72 ppm was fed from storage at a temperature of 60° C. to an evaporation unit containing a thin film evaporator, a plate molecular still and a short path evaporator. The feed rate of the crude tall oil to the evaporation unit was between 30-80 kg/h. The temperature of the first evaporation step was 137° C. and the pressure was 18 mbar. A first fraction comprising water and turpentine was removed from the feed of crude tall oil.

The first evaporation step was performed on a thin film evaporator. In the first evaporator, all together 3% of the original amount of crude tall oil was evaporated, of which 2% was turpentine and other light hydrocarbon compounds and 1% was water. 97% of the amount of the original feed of crude tall oil was recovered as condensate, i.e. second fraction from the first evaporator and fed further to a second evaporator. The second evaporation step was performed on a plate molecular still at 220° C. and 1 mbar. 50% of the amount of the original feed of crude tall oil was removed from the second evaporation step as a liquid fraction. Distillate fraction was recovered from the second evaporating step and the amount of it was 47% of the amount of the original feed of crude tall oil. The liquid fraction from the second evaporation step was fed to the third evaporation step. The third evaporation step was performed on a short path evaporator at 330° C. and 0.1 mbar. The amount of the residue fraction removed from the third evaporator was 5.5% from the original feed and it contained 1 550 ppm metals in total, consisting mainly of Na, Fe, P and 10 to 20 other metals, and in addition to metals also $SO_4^{2-}$, in the form of $Na_2SO_4$ and lignin. Distillate, third fraction, was also recovered from the second evaporating step. Distillates from evaporation stages 2 and 3 were collected and mixed together. The purified CTO had a 5 ppm metal content.

From the examples above it is obvious that using a multi-stage evaporation according to the invention for purifying CTO is a very efficient method for removing impurities from it. It is also obvious that by using the process according to the invention, light neutral components can be separated to be processed to raw materials for valuable transportation fuel products and the amount of the residue fraction, pitch, is minimized.

It will be obvious to a person skilled in the art that, as the technology advances, the inventive concept can be implemented in various ways. The invention and its embodiments are not limited to the examples described above but may vary within the scope of the claims.

The invention claimed is:
1. An apparatus for purifying tall oil material, characterized in that the apparatus comprises three sequentially arranged evaporators (10, 16, 20) wherein
   the first evaporator (10) is arranged to evaporate said tall oil material to produce a first fraction comprising hydrocarbons having a boiling point of up to 250° C. at normal pressure and water and a second fraction comprising fatty acids, resin acids, neutral substances and residue components,
   the second evaporator (16) is arranged to evaporate said second fraction and to produce a liquid fraction, and
   the third evaporator (20) is arranged to evaporate the liquid fraction and to produce a third fraction comprising fatty acids, resin acids and neutral substances having a boiling point under 500° C. at normal pressure and a residue fraction,
   a first connection (14) arranged to feed the second fraction to the second evaporator (16),
   a further connections (19) between said second evaporators (16) and said third evaporator (20), and
   a residue outlet (22) for recovering the residue fraction from the third evaporator (20).
2. The apparatus according to claim 1, characterized in that the apparatus further comprises a first product outlet (12) for recovering the first fraction comprising hydrocarbons having a boiling point of up to 250° C. at normal pressure and water from the first evaporator (10), a second product outlet (18) for recovering the third fraction from said third evaporator (20).
3. The apparatus according to claim 1, characterized in that the apparatus further comprises one or more first feed inlets (8) arranged to feed the tall oil material to said first evaporator (10).
4. The apparatus according to claim 1, characterized in that the evaporators (10, 16, 20) are selected from the group consisting of evaporators using thin film evaporation technology.

5. The apparatus according to claim 4, characterized in that the evaporators are selected from the group consisting of thin film evaporator, falling film evaporator, short path evaporator and plate molecular still.

6. The apparatus according to claim 1, characterized in that the apparatus further comprises at least one catalytic hydroconversion unit (C1, C2) for converting the hydrocarbons having a boiling point of up to 250° C. at normal pressure of the first fraction to one more biofuels or components thereof selected from the group consisting of gasoline, naphtha, jet fuel, diesel and fuel gases and/or for converting the third fraction comprising fatty acids, resin acids and neutral substances having a boiling point under 500° C. at normal pressure to one or more biofuels or components thereof selected from diesel, jet fuel, gasoline, naphtha and fuel gases.

* * * * *